Sept. 30, 1941.   R. J. OLANDER   2,257,307
QUICK TAKE-UP MECHANISM
Filed June 13, 1940   2 Sheets—Sheet 2
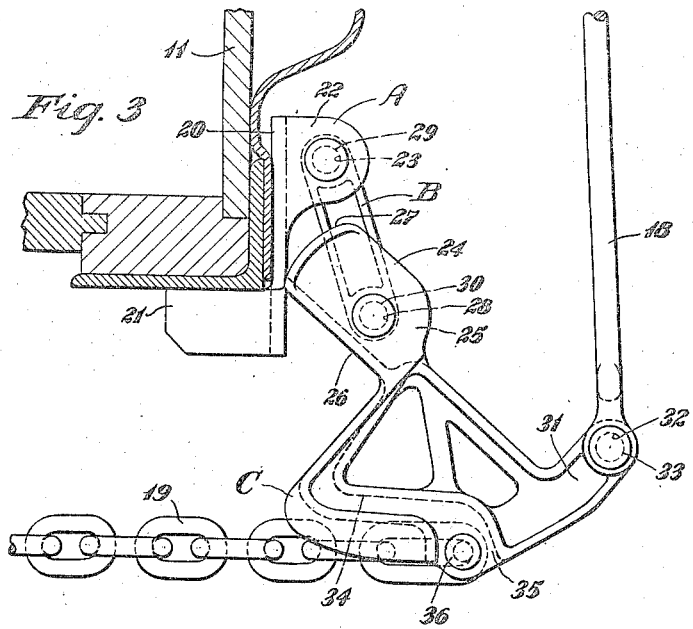
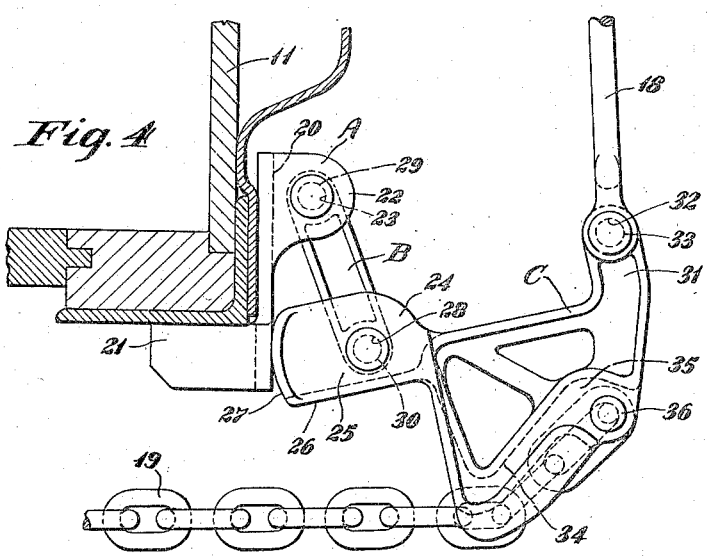
Inventor
Roland J. Olander
By Henry Fuchs.
Atty.

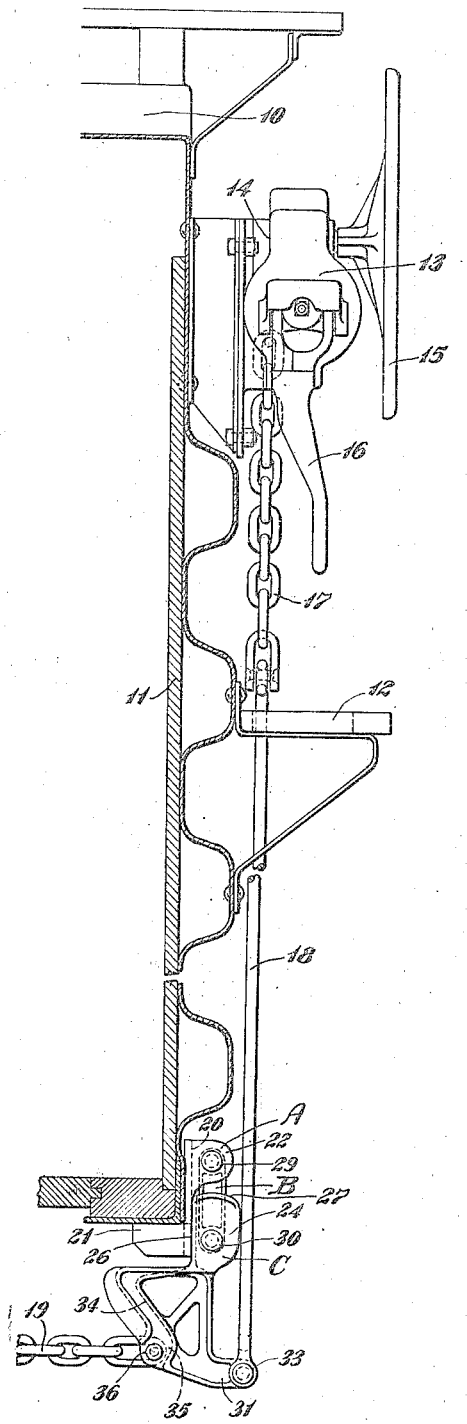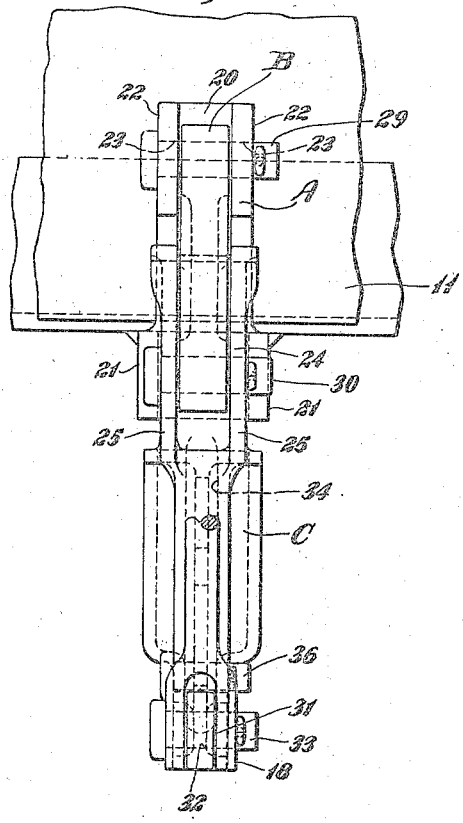

Patented Sept. 30, 1941

2,257,307

UNITED STATES PATENT OFFICE 2,257,307

QUICK TAKE-UP MECHANISM

Roland J. Olander, Chicago, Ill., assignor to W. H. Miner, Inc., Chicago, Ill., a corporation of Delaware Application June 13, 1940, Serial No. 340,252

8 Claims. (Cl. 74—513)

This invention relates to improvements in quick take-up mechanisms for hand brakes.

One object of the invention is to provide a quick take-up mechanism for power multiplying hand brakes for railway cars, comprising bell crank means for transmitting the power from the hand actuated brake mechanism to the brake shoes of the car, wherein the effective leverage of the bell crank means is greatly increased at a predetermined point in the application of the brakes by reducing the radius of swinging movement of the bell crank to provide for high multiplication of power during final application of the brakes, preceded by quick take up of the slack in the brake mechanism proper of the car during initial application of the brakes.

Another and more specific object of the invention is to provide bell crank lever means comprising a bell crank lever proper pivotally hung on a swinging support or link for transmitting the power from the winding mechanism of a hand brake to the brake shoes of the brake mechanism proper of the car, wherein the link is positively swung during initial application of the brakes to displace the pivotal axis of the bell crank member proper and thereby provide a relatively long motion increasing lever arm effect to quickly take up the slack, and swinging movement of the link is arrested during final application of the brakes, thereby causing the bell crank to swing on its pivotal axis to provide a power multiplying lever arm effect to forcibly apply the brakes.

A further object of the invention is to provide bell crank means of the character specified in the preceding paragraph wherein the movement of the link is positively controlled through action of the bell crank in its swinging movement.

Other objects of the invention will more clearly appear from the description and claims hereinafter following.

In the drawings forming a part of this specification, Figure 1 is a vertical longitudinal sectional view through the end portion of a railway car illustrating my improvements in connection therewith, said view being partly broken. Figure 2 is an elevational view, looking from right to left in Figure 1 of the mechanism at the lower end of the car, on an enlarged scale. Figure 3 is a view similar to Figure 1, on an enlarged scale, of the mechanism at the lower end of the car, but showing the parts in different position. Figure 4 is a view similar to Figure 3 showing the parts in a still different position.

In said drawings, 10 indicates the end portion of a railway car having a vertical end wall 11 on which is mounted the usual platform 12 for the brakeman.

My improved quick take-up mechanism is herein illustrated in connection with a power multiplying brake mechanism 13 of well-known type, comprising a worm driven winding element for the chain, as shown in Patents Nos. 1,974,581 and 1,854,804, granted to me. The chain winding element and associated mechanism of the hand brake 13 are contained in a housing 14 secured to the end wall 11 of the car, and said mechanism is actuated by the usual hand wheel 15, as disclosed in the patents hereinbefore referred to. The worm operated actuating means is connected to the winding element by a lever operated clutch means. In the brake mechanism illustrated herein the clutch operating lever is indicated by 16. The winding element of the power multiplying brake mechanism 13 has a chain section 17 connected thereto, said section being wound on said element when the hand wheel 15 is rotated in brake tightening direction. A pull-up rod 18 is connected to the lower end of the chain 17. Motion of the chain 17 and the connected rod 18 is transmitted to the chain section 19 leading to the brake mechanism proper of the car through my improved quick take-up mechanism.

My improved quick take-up mechanism comprises broadly a supporting bracket A secured to the car; a swinging link B pivotally hung on the bracket A; and a bell crank member C pivotally connected to the lower end of the link B.

The bracket A comprises a vertically disposed platelike section 20 having a horizontal, laterally inwardly projecting foot portion 21 at its lower end engaged beneath the bottom of the car. At the upper end, the platelike section 20 of the bracket A is provided with a pair of outstanding, laterally spaced, pivot lugs 22—22, which are perforated, as indicated at 23—23, to accommodate a pivot pin. The bracket A, which is mounted on the lower end portion of the wall 11 of the car, has the platelike section thereof abutting said end wall, and is fixed to the car by any suitable securing means extending through said bracket and into the wall 11.

The bell crank member C, which is preferably a casting, has a wing or head portion 24 at its upper end by which it is pivotally supported. The wing or head 24 is forked, as clearly shown in Figure 2, to accommodate the lower end of the link B, the arms of the forked portion being indicated by 25—25. The arms 25—25 have straight inner side edge faces 26—26 and rounded upper end edges 27—27, the faces 26—26 and edges 27—27 forming cam means for a purpose hereinafter pointed out. The arms 25—25 of the fork are provided with transversely aligned pivot pin receiving openings 28—28 adjacent the point where the head 24 merges with the bell crank member proper. In this connection it is pointed out that the curved edges 27—27 of the arms 25—25 of the head 24 are concentric with the pivot openings 28—28.

The bell crank member C is supported by the link B which is in the form of a bar having pivot pin receiving openings at opposite ends. The upper end of the link B is embraced between the lugs 22—22 of the bracket A and is pivotally connected to said lugs by a pivot pin 29 extending through the pivot pin openings of said lugs and the opening at the upper end of the link. The lower end of the link B is embraced between the arms 25—25 of the head 24 and a pivot pin 30 extending through the pivot pin receiving openings of said arms and the opening at the lower end of the link pivotally connects the bell crank member C to said link.

The bell crank member C is provided with an outstanding lug or arm 31 at the bottom section thereof having a pin receiving opening 32. The arm 31 is operatively connected to the rod or link 18 by a pin 33 extending through the lower extremity of said rod and the opening 32 of said arm, the lower end of the rod 18 preferably being forked to embrace said arm on opposite sides. As will be evident, the bell crank C is thus operatively connected to the winding means of the brake mechanism 13 by the rod 18 and the connecting chain 17. Along the inner side edge, the lower section of the bell crank member C is provided with a chain guide groove 34 which extends from the top of the bottom section of the bell crank C along the inner side edge thereof, as shown in Figure 1, and terminates in a depression 35 forming a pocket in which the end link of the chain section 19 is secured by a pin 36 extending through the opening of said link and the side walls of said pocket.

In the operation of applying the brakes the chain 17 is forcibly pulled upwardly by the power multiplying means of the brake mechanism 13. During the initial upward pulling action, the bell crank C is swung or rocked outwardly away from the car on its pivot 30, through the application of the force to the arm 31 of the bell crank at the connection of the latter with the pull-up rod or link 18, moving the parts from the position in Figure 1 toward that shown in Figure 3. During this movement of the bell crank, the link B is swung outwardly away from the car due to the camming action of the head 24 of the bell crank against the vertical plate section 20 of the bracket A, thereby displacing the pivot 30 of the bell crank outwardly as the bell crank swings about said pivot. The slack in the brake chain 19 and connected mechanism is thus quickly taken up. As the parts reach the position shown in Figure 3, the slack has substantially been taken up and the brake shoes brought into contact with the wheels of the car. Continued upward pulling action of the brake chain 17 and the pull-up rod 18 effects further swinging movement of the bell crank C, thereby moving the same from the position shown in Figure 3 toward or to the position shown in Figure 4. Thus, as application of the brakes is continued the link B is maintained substantially stationary due to the curved edge faces 27—27 of the head 24 of the bell crank sliding over the flat vertical surface of the plate section 20 of the bracket A. Inasmuch as the pivot 30 of the bell crank remains stationary during this action, the power is multiplied and the brake shoes pressed against the car wheels with great force.

When the brakes are released by the chain 17 being unwound from the winding mechanism of the hand brake 13, the bell crank C first swings backwardly about its pivot 30, which remains stationary, from the position shown in Figure 4 to that shown in Figure 3, the link B being held outwardly by the action of the head 24, the curved edge faces of which bear on the plate of the bracket A and are concentric with the pivot 30. This action continues until the curved edge faces of the head of the bell crank clear the plate section of the bracket A, permitting the link B to swing inwardly until arrested by contact of the flat side 26 of the head of the bell crank with the flat face of the bracket A, as shown in Figure 1.

As will be evident from the preceding description taken in connection with the drawings, my improved quick take-up mechanism provides for exceptionally quick take up during the initial application of the brakes due to the outward travel of the pivot of the bell crank as the same swings on its pivot, followed by powerful application of the brakes due to the increase in length of the lever arm of the applied force when the pivot of the bell crank becomes stationary.

I have herein shown and described what I now consider the preferred manner of carrying out my invention, but the same is merely illustrative and I contemplate all changes and modifications that come within the scope of the claims appended hereto.

I claim:

1. In a quick take-up mechanism for hand brakes for cars, the combination with a pulling element; of a motion transmitting element; a fixed abutment; a swinging support; a bell crank element pivotally mounted on said support, said bell crank lever being connected respectively to said pulling element at one side of the pivotal mounting thereof and motion transmitting element for transmitting motion from said pulling element to said transmitting element; and a rigid arm on said bell crank at the other side of said pivotal mounting thereof engaging said abutment during rocking movement of said bell crank with respect to said support for positively swinging said support during initial application of the brakes to displace the pivot of said bell crank.

2. In a quick take-up mechanism for hand brakes for cars, the combination with a pulling element; of a motion transmitting element; a swinging support; a bell crank pivotally hung on said support and movable therewith, said bell crank having a projecting cam head at one side of said pivot and being connected at the other side of said pivot respectively to said pulling element and motion transmitting element for transmitting motion from the former to the latter; and fixed means with which said head of the bell crank has camming engagement for swinging said support to displace the pivotal axis of the bell crank upon rocking of the latter during initial application of the brakes.

3. In a quick take-up mechanism for hand brakes for cars, the combination with a support on the end of the car having an upright abutment face; of a link pivotally supported at its upper end on said support; a bell crank element pivotally hung on the lower end of said link; a cam projection on said bell crank adapted to engage said upright abutment face during swinging movement of the bell crank to swing said link outwardly away from the end of the car; a motion transmitting element connected to said bell crank at a point spaced from the pivotal mounting thereof to provide a lever arm; and a pulling element connected to said bell crank at a point removed from the pivotal mounting thereof to effect swinging movement of said bell crank.

4. In a quick take-up mechanism for hand brakes for cars, the combination with a pulling element; of a motion transmitting element; an upright support fixed to the end of the car; a link pivotally supported at its upper end on said support; a bell crank pivotally hung at its upper end on the lower end of said link, said bell crank having an outstanding arm to which said pull-up element is connected; means for connecting the motion transmitting element to the lower portion of said bell crank; and a projecting cam member rigid with said bell crank engageable with said support to cam the lower end of said link outwardly during rocking movement of said bell crank.

5. In a quick take-up mechanism for hand brakes for cars, the combination with a pulling element; of a motion transmitting element; a depending swinging link pivotally supported on the car; a bell crank member pivoted on said link at a point below the pivotal support of said link on the car, said member having lever arms to which said pulling element and motion transmitting element are respectively anchored; and a cam member on said bell crank member for forcing said link to swing outwardly away from the car during initial application of the brakes, said cam member having a rounded face concentric to the axis of pivotal movement of said crank member on its pivotal connection with said link for maintaining said link in fixed position during final application of the brakes.

6. In a quick take-up mechanism for hand brakes for cars, the combination with a pull-up element; of a motion transmitting element; a support having an upright abutment face; a swinging link pivoted at its upper end on the support at the upper end of said abutment face; a bell crank pivoted at its upper end to the lower end of said link; and a rigid cam head on said bell crank having a straight face on one side thereof and a rounded upper face concentric with the pivotal connection of said bell crank with said link, said rounded face merging with said straight face, said flat face normally engaging said upright abutment face, and means connecting said bell crank to the pull-up element and motion transmitting element, whereby upward pull exerted on said pull-up element swings the lower end portion of the bell crank outwardly to tighten the motion transmitting element and cam the lower end of the link outwardly during initial application of the brakes through cam lever action of said straight face on the abutment face of said support, to take up slack, outward swinging of said link being arrested during final application of the brakes to thereby hold the pivot of the bell crank stationary during final application of the brakes, thereby holding the pivotal axis of the bell crank fixed and increasing the power transmitted through said bell crank from the pull-up element to the motion transmitting element.

7. In a quick take-up mechanism for hand brakes for cars, the combination with a pull-up element; of a motion transmitting element; an upright support on the end of the car; a swinging link pivotally supported at its upper end on the upper end section of said support; and a bell crank pivoted on the lower end of the link, said bell crank having a cam head thereon having a cam face having a portion thereof concentric to the pivotal axis of said bell crank, said bell crank having a long arm and a shorter arm to which said pull-up element and motion transmitting element are respectively connected, said bell crank being rocked outwardly away from the end of the car by upward pull of said pull-up element to quickly take up the slack in the brake mechanism during initial application of the brakes by camming of said link outwardly through the action of the cam head of said bell crank on the upright support and increase the braking force of the brakes during final application of the latter by arresting swinging movement of said link through engagement of said concentric portion of the cam face with said upright support.

8. In a quick take-up mechanism for hand brakes for cars, the combination with a support on the end of the car, said support having an upright flat face; of a link pivotally hung at its upper end on said support; a bell crank pivoted to the lower end of said link, said bell crank having a straight face at one side of the pivot thereof adapted to bear flatly on said upright face of the support, said bell crank having a face concentric with the pivotal connection of said bell crank with the link and adapted to engage said upright face after said bell crank has been swung on its pivot to a predetermined extent; a pull-up element connected to said bell crank for swinging the same; and means connected to said bell crank for transmitting the power to the brake mechanism proper of the car.

ROLAND J. OLANDER.